(12) United States Patent
Nalle, III (10) Patent No.: US 7,631,473 B2
(45) Date of Patent: Dec. 15, 2009

(54) CUTTER-SEALER FOR CUTTING AND SEALING POLYMER SHEETS

(76) Inventor: Thomas A. Nalle, III, 1621 Bingham Dr., Knoxville, TN (US) 37922

( * ) Notice: Subject to any disclaimer, the term of this patent is extended or adjusted under 35 U.S.C. 154(b) by 65 days.

(21) Appl. No.: 12/019,040

(22) Filed: Jan. 24, 2008

(65) Prior Publication Data

US 2008/0115638 A1 May 22, 2008

Related U.S. Application Data

(63) Continuation-in-part of application No. 10/945,771, filed on Sep. 21, 2004, now abandoned.

(51) Int. Cl.
*B65B 51/14* (2006.01)
*B26D 7/10* (2006.01)
*B31B 1/64* (2006.01)

(52) U.S. Cl. ............... 53/373.7; 53/374.8; 83/171; 156/515; 493/203; 493/209

(58) Field of Classification Search ............... 53/477, 53/479, 552, 370.7, 371.2, 371.8, 373.7, 53/374.2, 374.8, 375.9; 83/16, 171; 156/251, 156/515; 219/243; 493/203, 209
See application file for complete search history.

(56) References Cited

U.S. PATENT DOCUMENTS

| | | | |
|---|---|---|---|
| 2,837,883 A | 6/1958 | Bracey | |
| 3,045,403 A | 7/1962 | Mitchell | |
| 3,061,989 A | 11/1962 | Newell et al. | |
| 3,245,294 A * | 4/1966 | Butter et al. | .................... 83/16 |
| 3,551,260 A * | 12/1970 | Catherwood | .................. 53/477 |
| 3,940,305 A | 2/1976 | Stenberg | |
| 3,943,686 A | 3/1976 | Crawford et al. | |
| 4,209,958 A * | 7/1980 | Bailey | ........................ 53/375.9 |
| 4,512,138 A | 4/1985 | Greenawalt | |
| 4,551,965 A * | 11/1985 | Prottengeier | ................ 53/374.2 |
| 4,750,313 A | 6/1988 | Kammler et al. | |
| 4,807,426 A | 2/1989 | Smith | |
| 4,901,506 A * | 2/1990 | Weyandt | ....................... 53/479 |
| 4,949,846 A | 8/1990 | Lakey | |
| 5,056,295 A | 10/1991 | Williams | |
| 5,131,213 A | 7/1992 | Shanklin et al. | |

FOREIGN PATENT DOCUMENTS

| | | |
|---|---|---|
| FR | 2690412 A1 * | 10/1993 |
| JP | 04044935 A * | 2/1992 |
| JP | 05065146 A * | 3/1993 |

* cited by examiner

*Primary Examiner*—Stephen F Gerrity
(74) *Attorney, Agent, or Firm*—Pitts & Brittian, PC (57) ABSTRACT

A cutter-sealer (10) and a method (300) for cutting and sealing layers of film (70) together. The cutter-sealer (10) provides a heated blade (20), part of which moves through sheets of tautly held layers of film (70) into a slot defined by the seal pad (40). The blade's (20) motion is arrested by a set of blade shoulders (26) that press against the layers of film (70) for a period of time, thereby sealing the layers of film (70) together. The method (300) includes cutting layers of film (70) without liquefaction and sealing the newly cut edges of the layers of film (70) together, also without liquefaction of the layers of film (70).

4 Claims, 4 Drawing Sheets

CUTTER-SEALER FOR CUTTING AND SEALING POLYMER SHEETS

CROSS-REFERENCE TO RELATED APPLICATIONS

This application is a continuation-in-part of U.S. patent application Ser. No. 10/945,771, filed Sep. 21, 2004, now abandoned.

STATEMENT REGARDING FEDERALLY SPONSORED RESEARCH OR DEVELOPMENT

Not Applicable

BACKGROUND OF THE INVENTION

1. Field of Invention

The present invention relates to the field of cutting and sealing sheets of polymers. More particularly, this invention relates to cutting and sealing sheets of polymers such as the polyethylenes and polyolefins commonly used in products such as bubble film, bread bags and freezer bags.

2. Description of the Related Art

Cutter-sealers that use heat to cut and form a seal between the edges of sheets of polymer are well known in the art. Typically, a heated blade is brought to bear on two sheets of a polymer supported by a rubber seal pad. The heated blade melts the polymer and divides it in two to push liquefied polymer to each side of the blade. The liquefied polymer pushed to each side of the blade seals the edges of the newly divided polymer together. Thus the typical polymer cutter-sealer uses heat to melt the polymer so as to both divide and seal in a single operation.

The use of melting heat to both cut and seal is possible because of the unique properties of polymers, which are simply substances whose molecules have high molar masses and are composed of a large number of repeating units. Polymers are generally formed by chemical reactions in which a large number of molecules called monomers are joined sequentially, forming a chain. Plastic is the most common example of a polymer. A polymer's reaction to heat is determined by the molecules used as monomers and the structure of the chain. Polyethylenes, for example, are a subset of polymers in which the chains are formed by a double bond between carbon atoms. Polyethylenes are commonly used for padded packaging such as bubble film, which is made from sheets of materials that are sealed together to form a single layer of packaging having an array of air bubbles formed between the layers. Such bubble film is often cut to a desired length and sealed together to form the closed end of a container in an operation similar to that described above.

Obviously, the speed and quality with which polymer film containers can be produced is a significant factor in a competitive marketplace. Hence, several machines and techniques have been developed that focus on this particular aspect of the manufacturing process. Many of these, including the device disclosed in U.S. Pat. No. 5,056,295, issued to Williams, use heat to melt the polymer in order to both divide and seal. However, the use of melting heat simultaneously for both dividing and sealing operations forces conventional cutter-sealer blades to be heated to temperatures well above the melting point of the polymer film so that the necessary liquefaction occurs. The liquefaction of polymers, however, creates residue on the blade, which can stop production for removal of the residue or cause incomplete cuts and faulty seals if left unchecked. The high temperatures that are necessary also make it difficult for human operators to interact with the process.

The blade design dictated by the use of melting heat to cut and seal layers of polymer film often produces a thin or impartial seal. For example, in several designs, only the material pushed to the sides of the blade creates the seal. In such designs, the conventional blade may not push equal amounts of material to both sides, creating a thinner seal than normal on one side and more residue that normal on the other.

In other designs, such as U.S. Pat. No. 5,131,213, issued to Shanklin et al., a heating apparatus contacts a portion of the polymer layers, applying heat to the layers in order to seal a portion of the layers. Thereafter, a blade contacts the sealed layers to cut the sealed portion of the layers. In such designs, again the problem arises of exposing the cutting blade to a section of heated layers. In such designs, the initial heating of multiple polymer film layers followed by cutting of the heated layers often results in excessive buildup of melted polymer residue on the cutting blade, which can stop production for removal of the residue or cause incomplete cuts and faulty seals if left unchecked. In the case of sealing and cutting bubble film, such initial heating of multiple layers of bubble film can also result in overheating and explosive rupturing of the portion of the bubble array to be sealed and cut, thereby resulting in irregular and partial sealing of the bubble film layers.

BRIEF SUMMARY OF THE INVENTION

The present invention provides a cutter-sealer allowing for reduced or eliminated polymer buildup within the cutter-sealer, which can also operate at lower temperatures than conventional cutter-sealers, and a method for cutting sheets of polymer film and sealing the newly cut edges together to form the closed end of a wide variety of containers. The apparatus includes a blade having integrated sealing shoulders, a seal pad, and a means for tautly holding the target film layers over the seal pad.

The blade of the cutter-sealer has a somewhat narrow, elongated cutting section that includes a distal end defining a cutting edge. The cutting section terminates on a second side opposite the cutting edge in a set of integrally formed sealing shoulders that flare outward from the cutting section. A seal pad, which is made of rubber or a similar material, provides a slot designed to receive the cutting section of the blade at the end of its cutting motion. The seal pad also provides a set of flexible contact surfaces for the blade shoulders to push against during the sealing operation. A seal pad caddy is provided to hold the seal pad securely in place.

The cutter-sealer blade divides layers of polymer film by moving the cutting section through the layers of polymer film as they are held tautly over the slot in the seal pad, with heat serving to soften the polymer film and blade pressure serving to cause tension within the polymer film in order to break the polymer film substantially along a plane defined by the path of the cutting edge. Because the cutter-sealer is dependent on applying both heat and tension to the layers of polymer film, rather than being solely dependent on heat to divide the layers of polymer film like conventional blades, the amount of heat needed to soften the layers of polymer film is substantially reduced.

Subsequent to the cutting section of the blade moving through the layers of polymer film, the blade shoulders arrest the motion of the blade as the cutting section moves into the slot in the seal pad. In this manner, the blade shoulders pin the edges of the newly cut layers of polymer film against the flexible contact surfaces. The blade shoulders continue to apply force against the flexible contact surfaces and the pinned sections of polymer film. The applied force causes the blade shoulders to cooperate with the flexible contact surfaces to press the newly cut edges together. The flexibility of the contact surfaces smoothes out any irregularities in the surface of the layers of polymer film. As the blade shoulders pin the sections of polymer film against the contact surfaces, heat is transmitted from the blade shoulders to the layers of polymer film. The combination of heat and pressure applied to the polymer film layers creates a laminate seal that bonds the layers of polymer film together at a temperature significantly reduced from more traditional cutting and sealing devices. For example, in the case of cutting and sealing polyethylene film, the cutter-sealer of the present invention heats the layers of polyethylene film to a temperature below the liquification temperature of the polyethylene film, and seals the polyethylene layers without melting or liquifying the polyethylene film layers or otherwise heating the polyethylene film layers to a molten state.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A cutter-sealer allowing for reduced or eliminated polymer buildup and a method for cutting and sealing sheets of one or more layers of polymer film are hereinafter disclosed. The layers include, but are not limited to, polymers, and more specifically, polyethylene. The cutter-sealer is illustrated generally at 10 in the figures, and, as will be discussed below, is designed to operate at lower temperatures than prior art cutter-sealers, including temperatures below the melting point of the polymer film to be cut.

Figure 1:
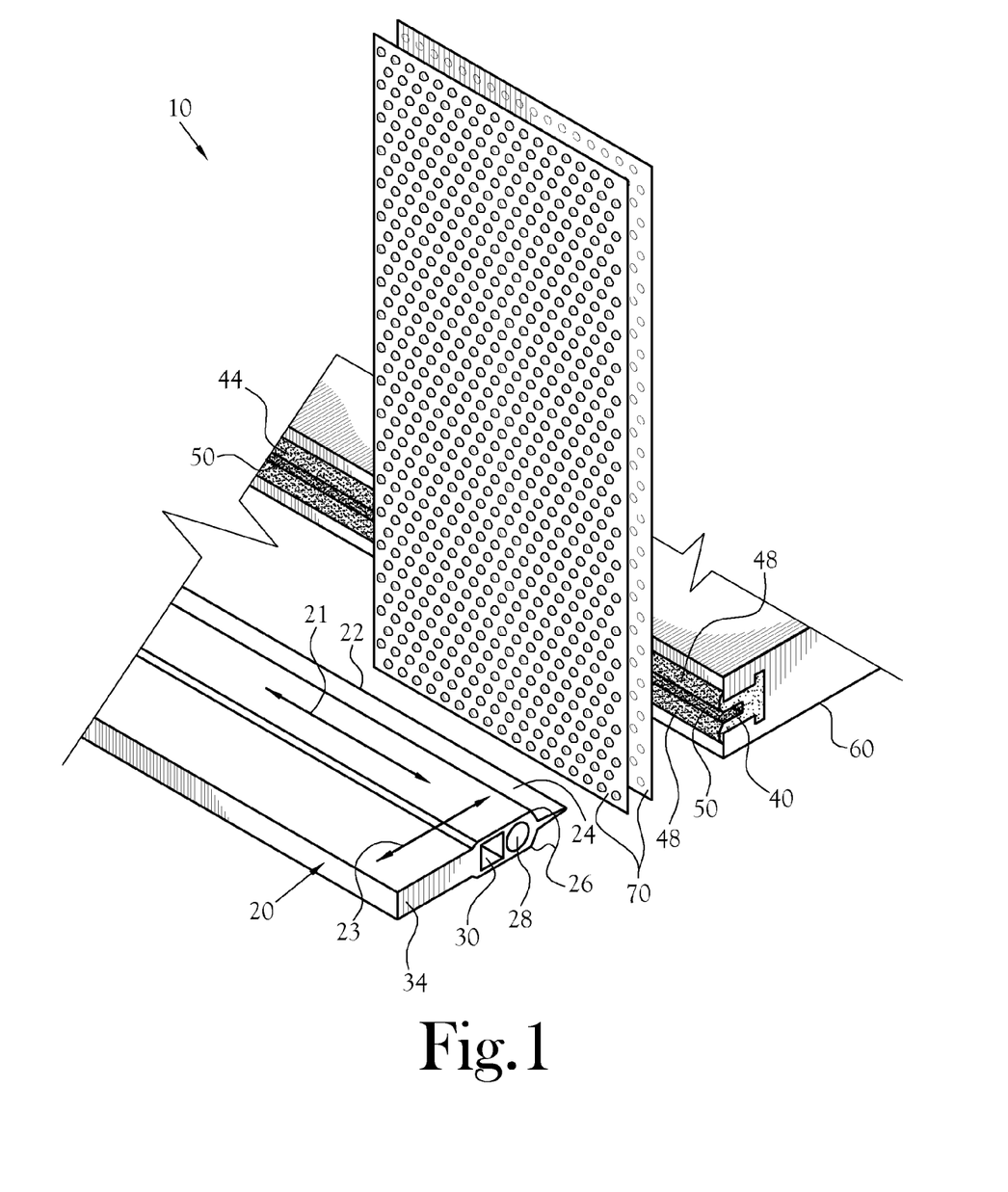
FIG. 1 is a partial perspective view of one embodiment of a cutter-sealer of the present invention.

As illustrated in FIG. 1, the cutter-sealer 10 includes a blade 20 that is selectively heated and a seal pad 40. The blade 20 and seal pad 40 cooperate to allow sheets of one or more layers of film 70 to be cut and sealed in separate, but temporally proximate operations at temperatures below the melting point of the layers of film 70. The blade 20 is designed for mounting on an arm or a machine that moves the blade in the direction of a cutting motion arrow 23 with the force necessary for the cutting and sealing operations. The blade 20 has a shank 34 that provides a stable area for mounting the blade on a mechanism that selectively advances and retracts the blade 20. It will be understood that the shank 34 may vary in size and configuration depending upon the advancing and retracting mechanism in which it is mounted. The blade 20 is made of one or more substances that are rigid and have a relatively high degree of thermal conductivity such as aluminum, although different substances may be used. It will also be noted that in one embodiment the blade is coated with a non-stick treatment to prevent the layers of film 70 from sticking to the blade. Further, it will be understood that the longitudinal dimension 21 of the blade 20 can vary, and is generally determined by the size of the layers of film to be cut and sealed.

Figure 2:
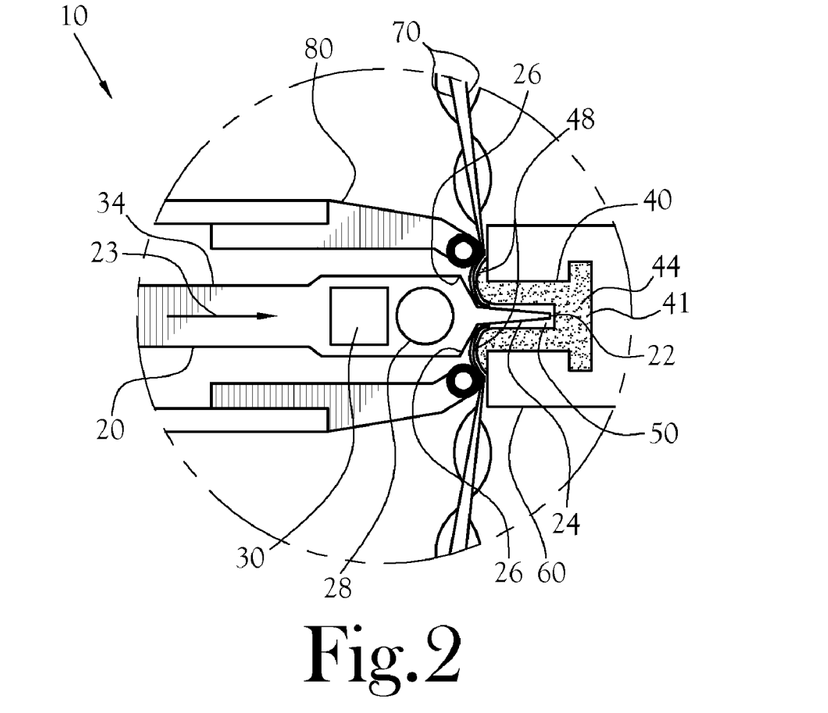
FIG. 2 is a partial side elevation view of one embodiment of a cutter-sealer in accordance with the present invention in operation.

FIG. 2 shows the cutter-sealer 10 in operation. As illustrated, the blade 20 defines a cutting section 24 terminating in a cutting edge 22. As will be discussed in detail below, the cutting section 24 is adapted to cut by moving through a section of film 70 held tautly across a slot 50, defined by the seal pad 40 and adapted to receive the cutting section 24. Further, the blade 20 defines oppositely disposed shoulders 26 that, as discussed below, serve to engage and assist in the sealing of the cut edges of the layers of film 70 once the cutting section 24 has moved through the layers of film. In the illustrated embodiment, the shoulders 26 are integrally formed with the blade. However, those skilled in the art will recognize that the shoulders 26 can be constructed separately from the blade 20 and secured to the blade 20 so as to be carried by the blade 20 without departing from the spirit and scope of the current invention. It will further be understood that the size, shape, and operating temperature of the shoulders 26 can vary substantially without exceeding the scope of the current invention.

Referring again to FIG. 1, in order to heat the blade 20 to the desired temperature for cutting and sealing, in one embodiment, the blade 20 is provided with a heater receptacle 28 that is adapted to receive a heater element (not shown) for transferring heat to the shoulders 26 in order to seal the layers of film together. The heater receptacle 28 in the embodiment of FIG. 1 is a through opening centered between the shoulders 26 of the illustrated blade 20. However, it will be recognized by those skilled in the art that heat may be provided to the blade 20 in different ways. Heat may be provided without the insertion of a heating element at all, or heat may be provided by the insertion of multiple heater elements. The need for a heater receptacle 28 is thus eliminated in the former situation and more than one heater receptacle 28 must be accommodated in the latter situation. Furthermore, any or all of the heater receptacles 28 in the blade 20 may vary in size, shape, position, or material. It will also be noted that, in the illustrated embodiment, the blade 20 is provided with a cooling channel 30 adapted to reduce the thermal conductivity of the blade 20 from the cooling channel 30 in the direction of the shank 34. Accordingly, when the shoulders 26 and cutting section 24 of the blade 20 are heated to the desired operating temperature, the shank 34, where heating is not necessary, is maintained at lower temperature. However, those skilled in the art will recognize that inclusion of the cooling channel 30 is not necessary to accomplish the cutter sealer 10 of the present invention.

Figure 4:
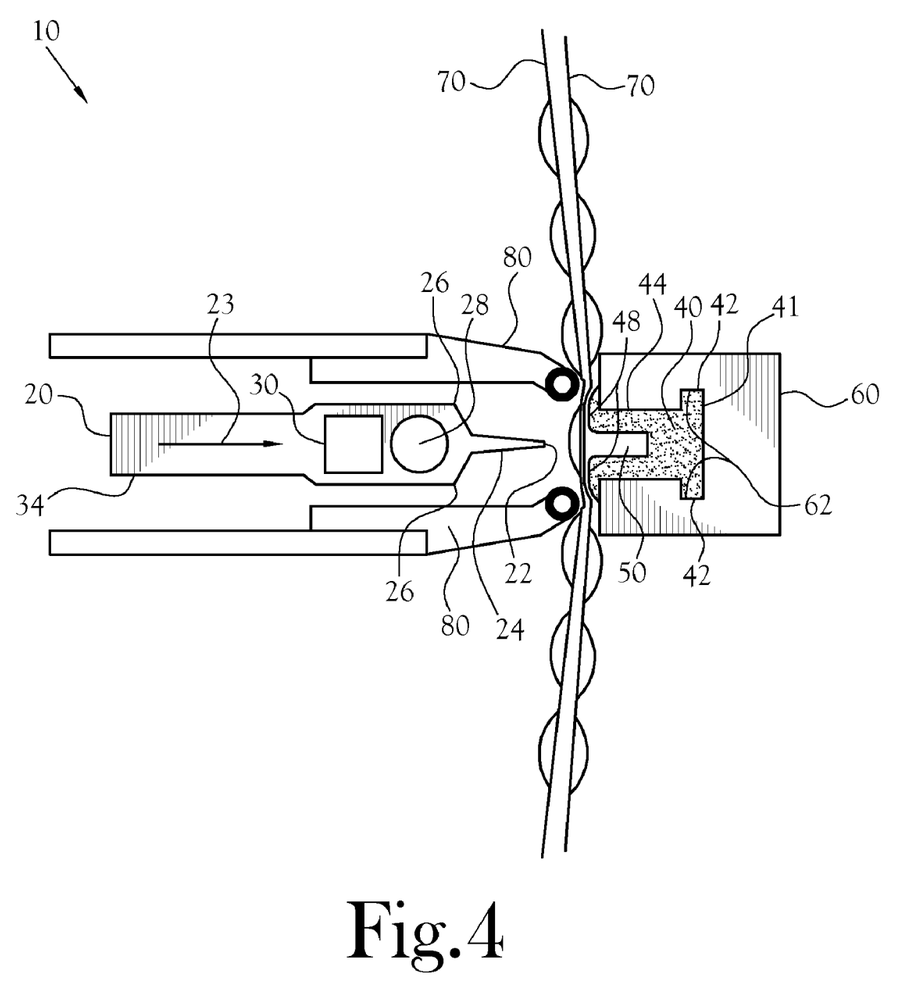
FIG. 4 is side elevation view of one embodiment of a cutter-sealer of the present invention.

As shown in FIGS. 1, 2 and 4, the seal pad 40 includes an elongated body 44 defining a seal pad slot 50 for receiving at least a portion of the cutting section 24 of the blade 20. Further, the seal pad 40 defines contact surfaces 48 disposed on opposite sides of the seal pad slot 50. As will be discussed in detail below, the contact surfaces 48 provide a surface against which the shoulders 26 of the blade 20 press to accomplish the sealing of the layers of film after such materials have been cut by the cutting edge 22. In this regard, in one preferred embodiment of the seal pad 40, at least the contact surfaces 48 thereof are made of a flexible material, such as rubber, the contours of which conform to the shape of the shoulders 26 of the blade 20 when the shoulders 26 are pressed against the contact surfaces 48 in order to ensure an even seal despite any irregularities in the layers of film 70 that might exist. Moreover, the flexibility compensates for any small irregularities in the surfaces of the blade 20 and seal pad 40.

In the illustrated embodiment, the seal pad 40 is mounted in a seal pad caddy 60 which provides a mechanism for releasably securing the seal pad 40 proximate the path of the blade 20. The combination of seal pad 40 and seal pad caddy 60 thus creates a structure with the seal pad slot 50, capped by the set of contact surfaces 48, on one side but bounded on the remaining five sides by what is essentially a case made of a strong, rigid material such as aluminum. In this regard, the use of aluminum in fabrication of the seal pad caddy 60 facilitates the dissipation of heat, but it will be understood that other fabricating materials could be used. The rigidity and strength of the seal pad caddy 60 allows the seal pad 40 to be held stationary without damage. With respect to the mechanism for releasably locking the seal pad 40 in the seal pad caddy 60, as illustrated in FIG. 4, in one embodiment the seal pad caddy 60 defines an elongated groove 41 into which the seal pad 40 is received, with the groove 41 defining opposing slots 62. Further, the seal pad is provided with oppositely disposed feet 42 for being slidably received in the slots 62, and which hold the seal pad 40 in the groove 41. It will, however, be understood that other means could be used to secure the seal pad 40 to the seal pad caddy 60. Moreover, it will be understood that other means could be used to secure the seal pad 40 proximate the path of the blade 20 without departing from the spirit and scope of the present invention.

Referring to FIGS. 2 and 4, in operation, the blade 20 divides the layers of film 70 by moving the cutting section 24 through the layers 70 as they are held tautly over the seal pad slot 50. In the illustrated embodiment, the layers of film 70 are depicted as two layers of bubble film. However, those skilled in the art will recognize that the present invention may be used to cut and seal other types of film without departing from the spirit and scope of the present invention. To this extent, various polymer films, such as polyethylene film and polyolefin film, are contemplated. The blade 20 is initially heated to a sufficient temperature such that, after the blade 20 contacts the film 70, heat sufficient to soften the film 70 without melting the film 70 is transferred to the film layers. As the blade 20 continues toward the seal pad slot 50, the cutting edge 22 applies pressure to the tautly held polymer layers 70, thereby creating tension in the polymer layers 70 sufficient to cause the polymer layers 70 to break substantially along the softened section of film. Because the cutter-sealer 10 is dependent on applying both heat and tension to the layers of polymer film 70, rather than being solely dependent on heat to divide the layers of polymer film 70 like conventional blades, the amount of heat needed to soften the layers of polymer film is substantially reduced. Those skilled in the art will recognize that the exact temperature sufficient to heat the blade 20 is dependent upon the specific material to be cut and sealed, together with the number of layers to be cut and the thickness of the layers. However, it will be understood that temperatures insufficient to liquefy the specific polymer film to be cut are contemplated.

As mentioned above, the operation of the cutter-sealer 10 contemplates that the layers of film be held tautly over the seal pad slot 50 such that pressure from the advancing blade 20 causes tension within the tautly held film 70, thereby causing the film 70 to break. Such breaking of the film 70 occurs substantially along a plane defined by the path 23 of the cutting edge 22, thereby allowing the blade 20 to continue through the film 70 and into the slot 50 without carrying the film layers 70 into the slot 50. As illustrated in FIGS. 2 and 4, in one embodiment, the polymer layers 70 are held tautly over the seal pad slot 50 by a set of film clamps 80 that press the layers of film 70 on either side of the seal pad slot 50 against surfaces provided by the seal pad 40 and seal pad caddy 60. However, other means of holding the layers of film tautly over the seal pad slot 50 may be used without departing from the scope and spirit of the current invention or altering the result.

In the embodiment of FIGS. 2 and 4, the cutter-sealer 10 is configured to cut two layers of polymer film, each layer of polymer film being approximately one one-thousandth of an inch in thickness. In this embodiment, after placement of the film 70 over the seal pad 40 in adjacent or substantially adjacent parallel planes, two film clamps 80 contact the seal pad caddy 60 to exert force against the film 70, thereby holding the film 70 with sufficient force over the seal pad 40 to restrain the film 70 proximate the seal pad 40.

Those skilled in the art will recognize that the exact force necessary to achieve suitable tautness of the layers of film 70 over the seal pad slot 50 will vary depending upon the properties of the specific material to be cut, the number of layers to be cut, the thickness of each of the layers, and the available clamping surface of the film clamps 80. As such, the film clamps 80 may be configured to exert any amount of force against the layers of film 70 necessary to secure the film 70 proximate the seal pad 40 so as to allow the blade 20 to break the film 70 substantially along the plane defined by the path of the cutting edge 22 after heat from the blade 20 softens the layers of film 70 without causing the blade 20 to carry the film layers 70 into the seal pad slot 60. For example, in one embodiment utilizing two film clamps 80, each film clamp being approximately one inch in length along the surface of the film 70, the film clamps 80 cooperate to exert a combined force of approximately 45 pounds against the seal pad caddy 60. In this embodiment, approximately 22.5 pounds per linear inch of clamp 80 is exerted against the film layers 70. In another embodiment utilizing two film clamps 80, each film clamp being approximately fourteen inches in length along the surface of the film 70, the film clamps 80 cooperate to exert a combined force of approximately 190 pounds along the length of the seal pad caddy 60.

As shown in FIG. 2, after heating of the blade 20 and advancement of the film clamps 80, the blade is continued along the path of travel 23 toward the seal pad slot 50. Upon contact with the blade 20, heat is transferred to the film 70, causing the contacted portion of the film layers to soften. The blade 20 continues along the path 23, exerting pressure on the film 70 and causing the film 70 to break substantially along a plane defined by the path 23 of the cutting edge 22. In one embodiment, the cutting edge 22 defines a sharp edge so that the blade 20 can easily divide the layers of film 70. However, it will be apparent to one skilled in the art that the combination of heat transferred to the film 70 to soften the film, together with the operation of the film clamps 80 to hold the layers of film tautly over the seal pad slot 50, allows for division of the film layers 70 using a blade 20 having a cutting edge 22 which is less sharp than the blades of several conventional prior-art cutter-sealers. To this extent, in the present embodiment, the cutting edge 22 has a radius of curvature of approximately ten one-thousandths of an inch. However, it will be understood that the radius of curvature of the cutting edge 22 may vary, depending upon the particular type and thickness of material to be cut, as well as the amount of heat transferred to the film layers 70 by the cutting edge 22 and the amount of force exerted by the film clamps 80, without departing from the spirit and scope of the current invention.

Subsequent to the cutting section 24 of the blade 20 moving through the layers of film 70, the motion of the blade 20 is arrested as the blade shoulders 26 press the newly cut layers of film 70 against the contact surfaces 48. In this manner, the blade shoulders 26 pin the edges of the newly cut layers of polymer film 70 against the contact surfaces 48. The blade shoulders 26 continue to apply force against the contact surfaces 48 and the pinned sections of polymer film 70. The applied force causes the blade shoulders 26 to cooperate with the contact surfaces 48 to press the newly cut edges together. The flexibility of the contact surfaces 48 smoothes out any irregularities in the surface of the layers of polymer film 70. At the same time, the blade shoulders 26 transfer heat to the newly cut edges of the layers of film 70 to seal them together. By applying both heat and pressure to the edges of the layers of film 70, rather than merely applying heat, the seal is accomplished at a temperature significantly reduced as compared to more traditional cutting and sealing devices, thereby allowing the blade 20 to be maintained at lower temperatures for most layers of film 70. For example, in the case of cutting and sealing polyethylene layers, the seal is accomplished without melting or liquefying the sealed portions of the layers of film 70. Of course, the desired or optimum temperature of the blade 20, and the desired or optimum length of time during which pressure is applied to the layers of film 70 by the blade shoulders 26, varies depending upon the particular characteristics of the layers of film being cut and sealed.

Figure 3:
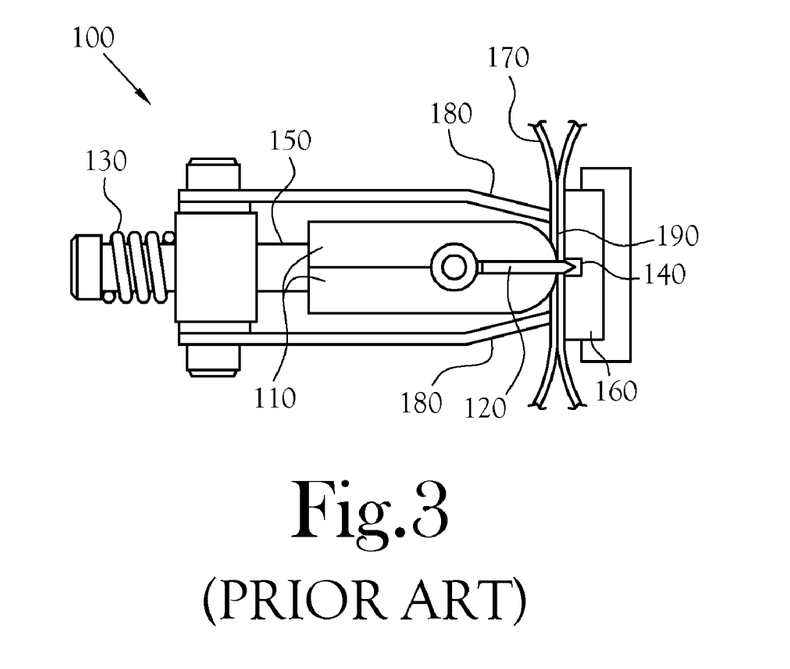
FIG. 3 is a side elevation view of a prior art cutter-sealer in operation.

In this regard, the characteristics of the present invention may be more clearly understood when viewed in light of certain prior art. FIG. 3, for example, shows a prior art cutter-sealer 100 of similar design to the device in U.S. Pat. No. 5,056,295, issued to Williams. In the prior art device of FIG. 3, a mounting member 150 is provided, onto which a pair of heating elements 110 is secured. A sharpened blade 120 is held between the heating elements 110 and heated to a temperature significantly above the melting point of the polymer material. A pair of clamping plates 180 is mounted on a spring mechanism 130 so as to extend toward a seal pad 160 defining a shallow seal pad slot 140.

In using the prior art cutter-sealer 110 of FIG. 3, sheets of one or more layers of polymer materials 170 are positioned in adjacent or nearly adjacent parallel planes and are placed between the heated blade 120 and a seal pad 160. As the blade 120 and heating elements 110 move toward the seal pad 160, the clamping plates 180 are carried on the spring mechanism 130 toward the seal pad 160. The clamping plates 180 contact the seal pad 160, whereupon the spring mechanism 50 yields to permit the clamping plates to push no further into the seal pad than necessary to secure the film 170 against movement of the film 170 proximate the action of the blade. The heated blade 120 continues to advance toward the seal pad 160, melting through the polymer materials 170, and pushing molten polymer material to each side as the heating elements 110 press against the seal pad 120. The seal in the prior art cutter-sealer 100 is actually formed by molten polymer material 170 pushed aside by the blade 120 and formed by the heating elements 110 contacting the polymer material 170.

When the blade 120 of FIG. 3 is heated to temperatures known commonly in the prior art, the molten polymer material pushed to each side of the blade 120 as the blade 120 moves through the polymer layers 170 tends to form into small beads of molten polymer that result in residue being deposited on the heated blade 120. By contrast, in the present invention (see FIG. 2), the cutting edge of the blade 20 moves through the broken layers of film 70 before sealing of the broken film layers occurs. Through this feature, the cutter-sealer 10 at least reduces the buildup of molten polymer materials on the cutting section 24 of the blade 20, and in many embodiments eliminates buildup of molten polymer materials on the cutting section 24 of the blade 20 altogether.

Furthermore, the sequence of breaking of the layers of film 70 prior to sealing of the cut film layers allows the cutting section 24 of the blade to be maintained at a significantly lower temperature than other prior art devices.

Figure 5:
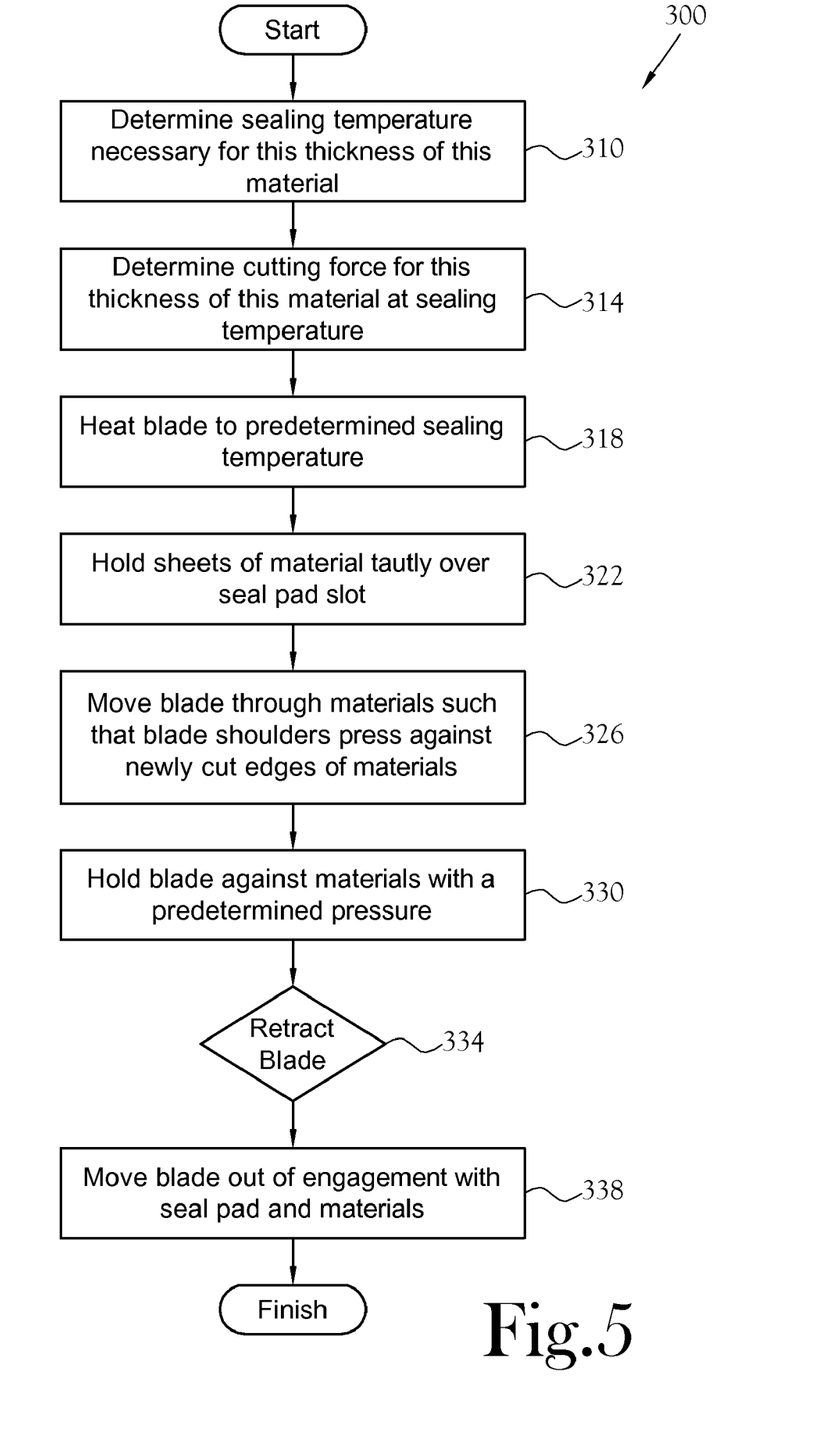
FIG. 5 is a flow diagram of one method of sealing and cutting in accordance with the present invention.

FIG. 5 provides a flow diagram illustrating one method 300 for cutting and sealing layers of film 70 in accordance with the present invention. The first steps are to determine the temperature to which the blade 20 must be raised to seal the layers of film 70 (referenced at 310) and to determine the cutting force which the blade 20 must exert against the layers of film 70 to cut them (referenced at 314). For example, for a polyethylene film having a thickness of one thousandth of an inch, the blade 20 temperature is preferably between 190 and 220 degrees Fahrenheit. (A conventional method and device would require temperatures between 325-360 degrees Fahrenheit). The blade 20 is then heated to the previously determined temperature as referenced at 318. The layers of film 70 are then held tautly across the seal pad slot 50 until the blade 20 cuts and seals the layers of film, and the blade is retracted as referenced at 322 in FIG. 5. The blade 20 is then moved with the predetermined cutting force through the layers of film 70 so that the shoulders 26 of the blade cooperate with the contact surfaces 48 to engage the newly cut edges of the layers of film 70 as referenced at 326. The blade 20 is then held in that position with a predetermined pressure applied 330 until conditions indicate 334 that it is time to retract the blade 20 as referenced at 330. Finally, the blade 20 is retracted from engagement with the seal pad 40 and the layers of film 70 as referenced at 334 and 338.

From the foregoing description, it will be recognized by those skilled in the art that a cutter-sealer 10 and associated method 300 for cutting and sealing layers of film 70 together has been provided. The cutter-sealer 10 and method 300 provide a means of cutting layers of film 70 at lower temperatures than is possible with prior art devices. As a result there is reduced or eliminated buildup of film material on the blade 20, and the overall cutting and sealing operation is safer. Furthermore, it will be understood to one skilled in the art that the cutter-sealer 10 of the present invention provides the advantage of applying both heat and pressure to cut layers of film 70 prior to sealing of the film layers, thereby allowing for more thorough and uniform sealing of the severed film layers 70.

While the present invention has been illustrated by description of several embodiments and while the illustrated embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

I claim:

1. A cutter-sealer for cutting and sealing layers of film, said cutter-sealer comprising:
   a blade for being selectively heated and for cutting and sealing the layers of film, said blade having:
      a cutting section with a distal portion defining a cutting edge, said cutting edge being adapted to transfer heat from said blade to the layers of film sufficient to soften a portion of the layers of film along said cutting edge without liquifying the layers of film; and
      at least one first blade shoulder fixed proximate said cutting section rearward of said cutting section, said at least one first blade shoulder being adapted to transfer heat to the layers of film; and a second blade shoulder fixed proximate said cutting section and oppositely disposed to said first blade shoulder;

wherein said blade defines a heater receptacle adapted for receiving a heating element;

a seal pad fabricated of a flexible material, said seal pad defining a seal pad slot adapted for receiving at least a portion of said cutting section of said blade, said seal pad further defining at least a first contact surface proximate said seal pad slot adapted to cooperate with said at least one first blade shoulder to engage the layers of film and press the layers of film together, said seal pad further defining a second contact surface proximate said seal pad slot;

a seal pad caddy for carrying said seal pad, wherein said seal pad caddy defines at least a first material fixation surface; and a means for selectively securing the layers of film proximate said seal pad slot, wherein said means for securing the layers of film proximate said seal pad slot includes at least one film clamp adapted to cooperate with said first material fixation surface to engage the layers of film and hold the layers of film tautly across said seal pad slot;

whereby after said cutting edge contacts the layers of film to heat and soften the layers of film without liquefying the layers of film, at least a portion of said cutting section of said blade travels through the layers of film and into said seal pad slot, thereby dividing the layers of film and allowing said at least one first blade shoulder to press the layers of divided film against said at least one first contact surface to accomplish sealing of the layers of divided film and whereby at least a portion of the layers of divided film are pressed between said second blade shoulder and said second contact surface to accomplish the sealing of the layers of film.

2. The cutter-sealer of claim 1 wherein said seal pad caddy defines a second material fixation surface disposed on the opposite side of said seal pad slot from said first material fixation surface, and wherein said means for securing the layers of film proximate said seal pad slot includes a second film clamp adapted to cooperate with said second material fixation surface to engage the layers of film, said first film clamp and first material fixation surface cooperating with said second film clamp and said second material fixation surface to hold the layers of film tautly across said seal pad slot.

3. The cutter-sealer of claim 2 wherein at least said cutting section of said blade is coated with a non-stick coating.

4. The cutter-sealer of claim 2, wherein said first and second blade shoulders are integrally formed with said blade.

* * * * *

(12) EX PARTE REEXAMINATION CERTIFICATE (10701st)
United States Patent
Nalle, III (10) Number: US 7,631,473 C1
(45) Certificate Issued: Sep. 4, 2015

(54) CUTTER-SEALER FOR CUTTING AND SEALING POLYMER SHEETS

(75) Inventor: Thomas A. Nalle, III, Knoxville, TN (US)

(73) Assignee: NAS NALLE AUTOMATION SYSTEMS, LLC, Knoxville, TN (US)

Reexamination Request:
No. 90/011,957, Oct. 14, 2011

Reexamination Certificate for:
Patent No.: 7,631,473
Issued: Dec. 15, 2009
Appl. No.: 12/019,040
Filed: Jan. 24, 2008

Related U.S. Application Data (63) Continuation-in-part of application No. 10/945,771, filed on Sep. 21, 2004, now abandoned.

(51) Int. Cl.
| | |
|---|---|
| *B65B 51/14* | (2006.01) |
| *B26D 7/10* | (2006.01) |
| *B31B 1/64* | (2006.01) |
| *B29C 65/00* | (2006.01) |
| *B29C 65/30* | (2006.01) |
| *B29C 65/74* | (2006.01) |

(52) U.S. Cl.
CPC . *B29C 66/80* (2013.01); *B26D 7/10* (2013.01); *B29C 65/305* (2013.01); *B29C 65/7412* (2013.01); *B29C 66/344* (2013.01)

(58) Field of Classification Search
None
See application file for complete search history.

(56) References Cited

To view the complete listing of prior art documents cited during the proceeding for Reexamination Control Number 90/011,957, please refer to the USPTO's public Patent Application Information Retrieval (PAIR) system under the Display References tab.

*Primary Examiner* — Danton DeMille (57) ABSTRACT

A cutter-sealer (10) and a method (300) for cutting and sealing layers of film (70) together. The cutter-sealer (10) provides a heated blade (20), part of which moves through sheets of tautly held layers of film (70) into a slot defined by the seal pad (40). The blade's (20) motion is arrested by a set of blade shoulders (26) that press against the layers of film (70) for a period of time, thereby sealing the layers of film (70) together. The method (300) includes cutting layers of film (70) without liquefaction and sealing the newly cut edges of the layers of film (70) together, also without liquefaction of the layers of film (70).

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

The patentability of claim 4 is confirmed.

Claims 1-3 are cancelled.

\* \* \* \* \*